(No Model.)
F. F. ANDERSON & T. KRAUSS.
ICE OR SNOW VEHICLE.
No. 566,438. Patented Aug. 25, 1896.
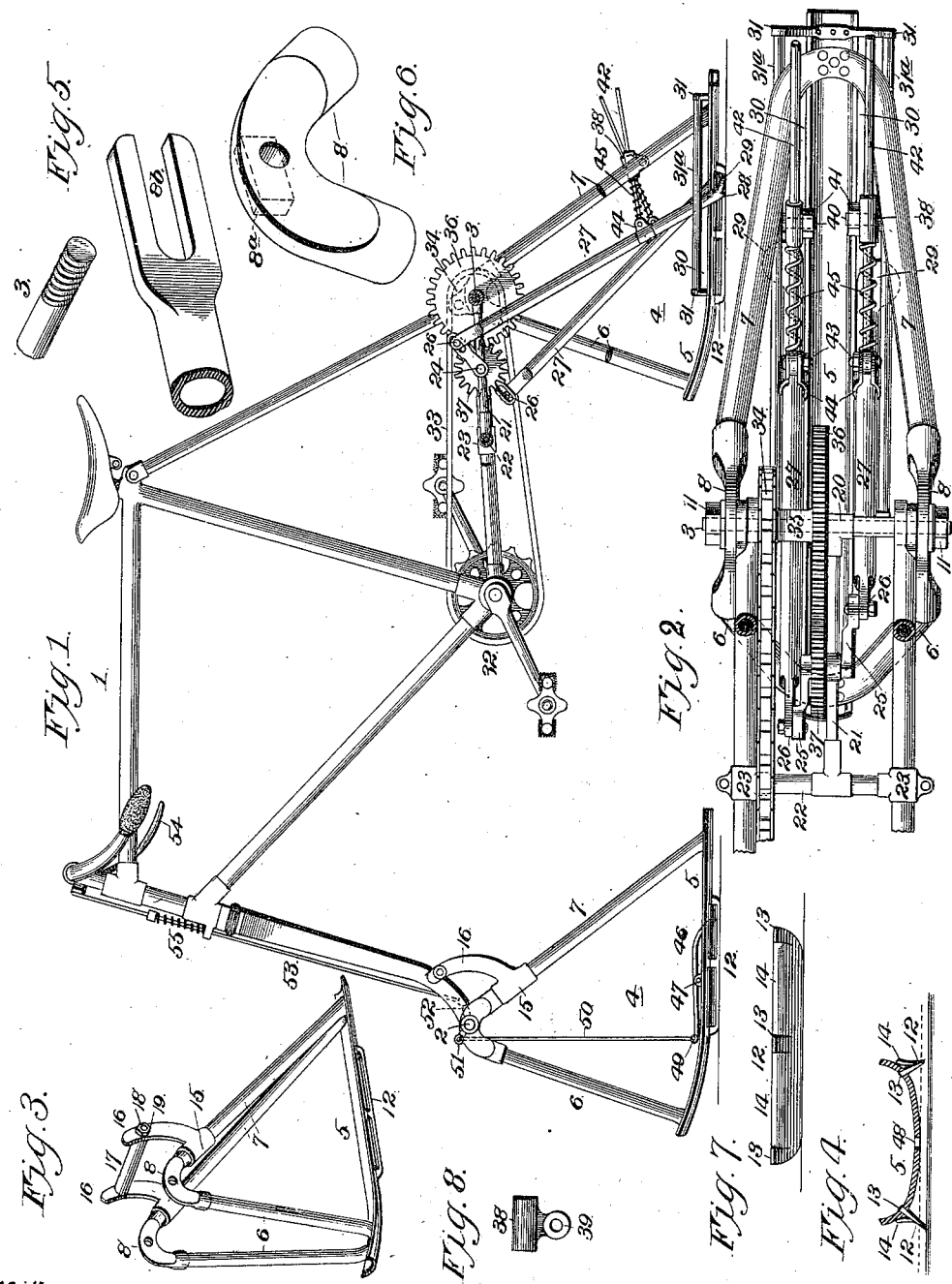
Witnesses:
Inventors,
Fred<u>k</u> F. Anderson & Theo Krauss
By Hyson & Hyson,
Attys.

UNITED STATES PATENT OFFICE.

FREDERICK F. ANDERSON AND THEODORE KRAUSS, OF ARGENTINE, KANSAS.

ICE OR SNOW VEHICLE.

SPECIFICATION forming part of Letters Patent No. 566,438, dated August 25, 1896.

Application filed November 7, 1895. Serial No. 568,180. (No model.)

*To all whom it may concern:*

Be it known that we, FREDERICK F. ANDERSON and THEODORE KRAUSS, of Argentine, Wyandotte county, Kansas, have invented certain new and useful Improvements in Ice or Snow Vehicles, of which the following is a full, clear, and exact description, reference being had to the accompanying drawings, forming a part thereof.

Our invention relates to ice and snow vehicles; and the object of the invention is to produce a machine of this character which is propelled by manual power and is thoroughly practical and which combines in a high degree lightness, simplicity, strength, and durability of construction.

Our invention contemplates the employment of a bicycle-frame of any preferred pattern or style, together with the power-transmitting mechanism and the customary retarding devices minus the brake-shoe, in combination with supporting sleds or runners and means for imparting motion and of retarding motion, *i. e.*, braking devices which will connect with the retarding devices of the bicycle-frame hereinbefore referred to. These sleds or runners, together with the motion-imparting devices and the brake mechanism, will be preferably detachably connected to the bicycle-frame, which therefore may be used, according to the season, with either wheels to form a bicycle or with the said attachments to form a snow or ice vehicle. Thus it is apparent that the expense of buying two complete machines is avoided.

The invention further consists in its novel and peculiar features of construction and organizations of parts, as is hereinafter described and claimed.

In order that the invention may be fully understood, reference is to be had to the accompanying drawings, in which—

Figure 1 represents principally in side elevation a vehicle constructed in accordance with our invention. Fig. 2 represents on an enlarged scale a horizontal section of the same and discloses more clearly the construction and arrangement of the power mechanism. Fig. 3 is a detailed perspective view of the front sled or runner. Fig. 4 represents on an enlarged scale a cross-section of said sled or runner. Fig. 5 represents detailed perspective views of a part of the rear axle and of a part of one of the rear forks of the bicycle-frame. Fig. 6 is a perspective view of one of the connections between the arms of the rear sled or runner. Fig. 7 is a view in side elevation of one of the skates of the vehicle. Fig. 8 is a view of a pivoted sleeve, hereinafter described.

In the said drawings, 1 designates a bicycle-frame of the type shown or of any other preferred type. 2 designates the front axle, and 3 the rear axle. Said frame is mounted upon sleds or runners 4, which each consists of a runner proper, 5, of steel or other suitable material, and of the approximately V-shaped arms 6 and 7, which converge upwardly at suitable angles and are united at their upper ends by couplings 8. These arms are preferably of steel tubing bent to the required form. The runner is preferably segmental in cross-section or gutter-shaped and curved upwardly at its front end that it may glide over slight obstructions, and depending divergently from said runners are the skates 12. Said skates are preferably of steel and are stamped to form the combs 13, which project through and are riveted to the runner and the upwardly and outwardly diverging brace-arms 14 and may be riveted to the outer side of the runner, if desired.

In securing the front runner in proper relative position to the frame the lower ends of the front fork of the frame are fitted snugly between the couplings 8, which of course are constructed the required distance apart. The axle 2 is then extended through the registering apertures of the couplings 8 and the said fork and is engaged at its opposite ends in the customary manner by clamping-nuts. In order that the relative positions between said front runner and the frame may not depend alone upon the axle connection, we mount rigidly upon the upper ends of the arms 7 the sleeves 15, which are provided with upwardly-projecting arms 16, which fit snugly against the outer sides of the fork. These arms are braced apart and tied together by means of the interposed sleeve 17 and the bolt 18, which extends through said sleeve and registering apertures in said arms, and engaging the projecting threaded end of said bolt is the clamping-nut 19. The connection between the rear forks and the rear sled or runner is in some respects different.

The couplings 8 of said sled or runner are provided with apertures which are engaged by the rear axle 3, as before; but in addition said couplings are provided at their inner sides with the rectangular projections 8ª, which fit in slots 8ᵇ, found at the rear ends of all bicycle-frames of approved construction. The axle 3 extends also through said projections. This construction is provided at this point in order to assist the axle 3 and the clamping-nuts 11 in maintaining the relation between the rear forks and the rear sled or runner in lieu of the construction first described, though it is to be understood, of course, that such construction may be employed at the rear end of the vehicle-sleds as well as at the front end.

Mounted on the rear axle is a sleeve 20, provided with a coupling, and a longitudinally-extending bar 21 connects said coupling with a coupling upon the cross-bar 22, and said cross-bar is carried by couplings 23, detachably mounted upon the forks of the frame about midway between the rear axle and the crank-shaft of the vehicle. Journaled transversely in said bar 21 is a short shaft 24, and mounted rigidly upon opposite ends of the same are the cranks 25, longitudinally slotted at their outer ends. Said cranks are pivotally and adjustably connected, as at 26, to the upper ends of the push-bars 27, which are preferably formed of steel tubing and are provided at their lower ends with pointed heels or spurs 28 and with flattened bearing-shoes 29. The heels or spurs are designed to penetrate the ice or hard crust of snow, and the foot portions are to limit such penetration, when the push-bar is propelling the machine, and to cause it to slide more readily and easily forward when withdrawn or sliding inoperatively upon the surface of the ice or snow.

In order that the push-bars may operate in planes parallel with the rear sled or runner, we provide the longitudinal slots 30 at each side of said runner by means of the transverse arms 31 and the longitudinal rods 31ª. Said longitudinal rods, however, in order to reduce friction to the minimum, are in the form of antifriction-rollers, preferably of hard rubber, said rollers having their ends journaled in the arms 31.

In order to impart motion to the vehicle by the operation of the push-bars, the customary sprocket-wheel 32 is connected by the chain 33 to the sprocket-wheel 34, which, however, is preferably not the sprocket-wheel employed when the frame is mounted upon wheels, though it can be used in that connection, if desired. The sprocket-wheel 34 is preferably mounted rigidly upon one end of a sleeve 35, journaled upon the axle 3, and upon the other end of the same sleeve is keyed or otherwise rigidly mounted the cog-wheel 36, which meshes with the cog-pinion 37, mounted rigidly upon the short shaft 24.

From the foregoing it will be apparent that as the rider rotates the crank-shaft with his feet upon the pedals the motion is imparted to the shaft 24 through the medium of the connections above described, and this rotation of said shaft causes the cranks 25 to move the push-bars alternately to the rear and forward. As said cranks rise in moving forward, they bring said push-bars more nearly to a vertical position, and as a certain point in their orbit is passed they cause the sharpened heels or spurs of the push-bars to slightly penetrate the ice or hardened crust of snow, and exert a pressure which results in the rapid propulsion of the machine. In case the vehicle is being used upon snow the foot portions will prevent the heels or spurs penetrating too deeply, and thereby retarding the speed of the vehicle by the waste or loss of power. As these push-bars operate alternately, it is evident that a continuous pressure is exerted in the propulsion of the machine. It may be found desirable to employ additional push-bars in order to make the motion possibly more uniform and smooth. In this case it will only be necessary to provide a corresponding number of cranks.

In order to provide against any possible chance of the push-bars slipping under the pressure applied in the propulsion of the vehicle, particularly when traveling upon ice, we may employ devices constructed as follows: 38 designates guide-sleeves, which are provided with arms 39, pivotally mounted upon cylindrical studs 40, projecting inwardly from the arm 7 of the rear sled or runner and held in position by the retaining-nuts 41 engaging said studs. These sleeves are mounted so as to swing only in the same vertical plane as the push-bars 27, and extending slidingly through them are the rods 42, which are pivotally connected, as at 43, to the clips or sleeves 44, mounted rigidly upon the push-bars, near their lower ends. Spiral springs 45 surround said rods and bear at their opposite ends against said pivoted sleeves and the clips or sleeves 44, and therefore tend to force the push-bars continuously forward and downward, in order that there will be no possible chance of slipping when the pressure from the pedals is applied. These devices just described, however, we do not consider absolutely essential, and may dispense with them entirely.

In order to retard the motion of and stop the vehicle when desired, we provide a braking mechanism as follows: 46 designates the brake-shoe, which is pivoted, as at 47, to the front runner, and is curved downwardly at its rear or friction end, and is adapted to be instantly projected through the slot 48 in said runner into frictional contact with the ice or snow when necessary to retard the motion of and stop the vehicle. The opposite end of the brake-shoe is pivotally connected by the tie-rod 50 to the arm 51 of a bell-crank lever mounted pivotally upon the front axle 2, and connected with the arm 52 of said lever is the push-rod 53, forming a part of an ordinary bicycle-braking mechanism, and connected at its upper end to the brake-lever 54. The customary spring 55 for maintaining the brake in its inoperative position is employed in this connection, though it is obvious that the brake-shoe may be held from contact with the ice or snow in divers other ways. By this arrangement it is only necessary for the rider to grip the brake-lever in the customary manner to apply the brake.

When the machine is traveling upon ice, it will be supported solely by the skates 12, and the runners proper will not be in contact with the ice. These skates are made comparatively short to facilitate turning, and by arranging them parallel and at some distance apart it is obvious also that in making turns the skates on one side of said runners will be always in contact with the ice, and being comparatively sharp at their bearing edges will prevent the machine from slipping from under the rider. When traveling upon snow, the skates will not be an impediment to rapid motion, as they will penetrate the snow, and the runners proper of the vehicle will glide upon the surface of the snow. In making turns, as before, the runners by penetrating the snow will prevent the slipping of the vehicle.

This vehicle possesses one decided advantage which will recommend itself—that is, after a sufficient momentum is acquired the rider may cease pedaling without removing his feet from the pedals, which therefore will provide for him a foot-rest whenever he desires to rest, and during the cessation of pedal movement the vehicle will glide smoothly along and the push-bars will simply drag inoperatively behind, but ready at all times to respond to the movement of the crank-shaft in order to maintain or increase the speed of the vehicle.

It is obvious from the above description, taken in connection with the drawings, that a person skilled in the art to which this machine pertains may easily and expeditiously transform the device from a bicycle into a snow or ice vehicle, or vice versa.

It is obvious, of course, that various changes in the form, proportion, and arrangement of parts may be resorted to without departure from the spirit and scope of the invention, such changes, for instance, as the substitution of a sprocket chain and wheel connection between the rear axle and the crank-shaft 24, instead of the cog-gearing shown. We may also find it desirable to employ an antifriction-roller 31ª at each side of each slot 30 instead of at the outer side only.

Having thus described the invention, what we claim as new, and desire to secure by Letters Patent, is—

1. An ice and snow vehicle, comprising sleds or runners, a frame upon which a person may sit, mounted upon said sleds or runners, a crank-shaft journaled in said frame, push-bars pivotally connected at their upper ends to said crank-shaft, sleeves pivoted to arms of the runner in rear of the crank-shaft, rods pivotally connected to the push-bars and extending slidingly through said sleeves, expansion-springs mounted upon said rods between said push-bars and said sleeves, and means to rotate the crank-shaft, substantially as set forth.

2. An ice and snow vehicle, comprising sleds or runners, one of them provided with guide-slots, a frame upon which a person may sit mounted upon said sleds or runners, a crank-shaft journaled in said frame, push-bars extending through said guide-slots and pivotally connected at their upper ends to said crank-shaft, sleeves pivoted to arms of the runner in rear of the crank-shaft, rods pivotally connected to the push-bars and extending slidingly through said sleeves, expansion-springs mounted upon said rods between said push-bars and said sleeves, and means to rotate the crank-shaft, substantially as set forth.

3. An ice and snow vehicle, comprising a pair of sleds or runners arranged tandem, and mounted each upon a pair of skates, which project below the surface of the runner proper, a bicycle-frame mounted detachably upon said sleds or runners, upon which a person may sit, means for propelling said vehicle, and means for checking its motion consisting of a brake-shoe pivoted upon the front runner, a bell-crank lever pivoted between the front forks of the frame, a rod connecting the brake-shoe and the bell-crank lever, a handle-lever, a rod connecting the same also with the bell-crank lever, and a spring normally holding the brake-shoe above the surface of the ice or snow and opposite a slot or opening in the runner, through which it may be projected when it is desired to check the vehicle, substantially as and for the purpose set forth.

4. In an ice and snow vehicle, the combination with a bicycle-frame, of a front sled or runner, comprising the runner proper, upwardly-diverging arms, and couplings connected to said arms and clamped against the outer sides of the vehicle-forks and upon the front and rear axles of the vehicle, and sleeves secured upon arms of the front sled or runner and provided with arms which embrace externally the front fork, and are bolted firmly together, substantially as set forth.

In testimony whereof we affix our signatures in presence of two witnesses.

FREDERICK F. ANDERSON.
  THEODORE KRAUSS.

Witnesses:
  G. Y. THORPE,
  M. R. REMLEY.